United States Patent
Sherlekar et al.

(10) Patent No.: US 12,079,558 B2
(45) Date of Patent: Sep. 3, 2024

(54) ON-THE-FLY MULTI-BIT FLIP FLOP GENERATION

(71) Applicant: Synopsys, Inc., Sunnyvale, CA (US)

(72) Inventors: Deepak D. Sherlekar, Cupertino, CA (US); Basannagouda Reddy, Ontario (CA); Shanie George, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 18/144,685

(22) Filed: May 8, 2023

(65) Prior Publication Data

US 2023/0274064 A1  Aug. 31, 2023

Related U.S. Application Data

(62) Division of application No. 17/318,647, filed on May 12, 2021, now Pat. No. 11,681,848.

(60) Provisional application No. 63/024,426, filed on May 13, 2020, provisional application No. 63/023,632, filed on May 12, 2020.

(51) Int. Cl.
*G06F 30/392* (2020.01)
*G06F 30/3947* (2020.01)
*G06F 111/20* (2020.01)
*G06F 119/06* (2020.01)
*G06F 119/12* (2020.01)

(52) U.S. Cl.
CPC ........ *G06F 30/392* (2020.01); *G06F 30/3947* (2020.01); *G06F 2111/20* (2020.01); *G06F 2119/06* (2020.01); *G06F 2119/12* (2020.01)

(58) Field of Classification Search
USPC ........................................................ 716/113
See application file for complete search history.

(56) References Cited

U.S. PATENT DOCUMENTS

| | | | |
|---|---|---|---|
| 9,432,003 B2 | 8/2016 | Pasternak | |
| 9,513,658 B2 | 12/2016 | Krishnamurthy et al. | |
| 9,729,128 B2 | 8/2017 | Srivastava et al. | |
| 9,824,171 B2 | 11/2017 | Krishnamurthy et al. | |
| 10,338,139 B1 | 7/2019 | Ge et al. | |
| 10,990,745 B2 | 4/2021 | Chen et al. | |
| 11,095,272 B2 | 8/2021 | Wang et al. | |
| 2008/0313437 A1* | 12/2008 | Gschwind | G06F 9/30141 712/219 |
| 2011/0302548 A1 | 12/2011 | Arayama | |
| 2013/0194016 A1* | 8/2013 | Wimer | H03K 19/0016 327/199 |

FOREIGN PATENT DOCUMENTS

CN 110941936 A 3/2020

\* cited by examiner

*Primary Examiner* — Bryce M Aisaka
(74) *Attorney, Agent, or Firm* — Patterson + Sheridan, LLP

(57) ABSTRACT

On-the-fly multi-bit flip-flop (MBFF) generation is provided by selecting at least two flip-flop blocks from a plurality of candidate flip-flop blocks; identifying a control block from a plurality of candidate control blocks, the control block being identified based on operational specifications of the selected flip-flop blocks; and generating a multi-bit flip-flop instance based on the selected flip-flop blocks and the identified control block.

20 Claims, 12 Drawing Sheets

ON-THE-FLY MULTI-BIT FLIP FLOP GENERATION

CROSS-REFERENCE TO RELATED APPLICATIONS

The present disclosure is a divisional application of U.S. Non-Provisional patent application Ser. No. 17/318,647 filed on May 12, 2021, and claims priority to U.S. Provisional Application No. 63/023,632 filed May 12, 2020, and U.S. Provisional Application No. 63/024,426 filed May 13, 2020 which are hereby expressly incorporated by reference herein in their entireties as if fully set forth below and for all applicable purposes.

BACKGROUND

A multi-bit flip-flop includes multiple flip-flops (each corresponding to a bit for memory) and generally uses less space on a chip or board than an equivalent number of single-bit flip-flops, but can be challenging to place and route in conjunction with other circuit elements. A flip-flop is a clock-controlled memory device used to store an input state, and in response to the clock signal, output the stored state as a bit having a binary value. A single-bit flip-flop stores one bit of information, whereas a multi-bit flip-flop stores multiple bits of information. Flip-flops come in several varieties, including D flip-flops, T flip-flops, and JK flip-flops, of which any of one can be combined into a multi-bit flip-flop.

SUMMARY

In one embodiment, the present disclosure provides a method comprising: selecting at least two flip-flop blocks from a plurality of candidate flip-flop blocks; identifying a control block from a plurality of candidate control blocks, the control block being identified based on operational specifications of the selected flip-flop blocks; and generating a multi-bit flip-flop instance based on the selected flip-flop blocks and the identified control block.

In one embodiment, the present disclosure provides a system for multi-bit flip-flop architecture generation, comprising: a memory storing instructions; and a processor coupled with the memory and to execute the instructions, the instructions when executed cause the processor to: generate a plurality of candidate flip-flop blocks, each corresponding to a single bit of a multi-bit flip-flop; and generate a plurality of candidate control blocks, each configured to generate signals to drive the plurality of candidate flip-flop blocks, wherein one of the plurality of candidate control blocks and at least two of the plurality of candidate flip-flop blocks are configured to construct a customized multi-bit flip-flop instance, a quantity of the at least two of the plurality of candidate flip-flop blocks being associated with a number of bits of the customized multi-bit flip-flop instance.

In one embodiment, the present disclosure provides a method, comprising: identifying control components and flip-flop components in a pre-built cell; defining at least a first flip-flop block to contain a first portion of the flip-flop components; defining a control block to contain the control components; generating a flexible multi-bit flip-flop (FlexMBFF) instance based on routing of shared signals pathways from the control block to the at least the first flip-flop block; and defining, based on the FlexMBFF instance, a FlexMBFF family that includes a plurality of control blocks and a plurality of flip flop blocks with different characteristics.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
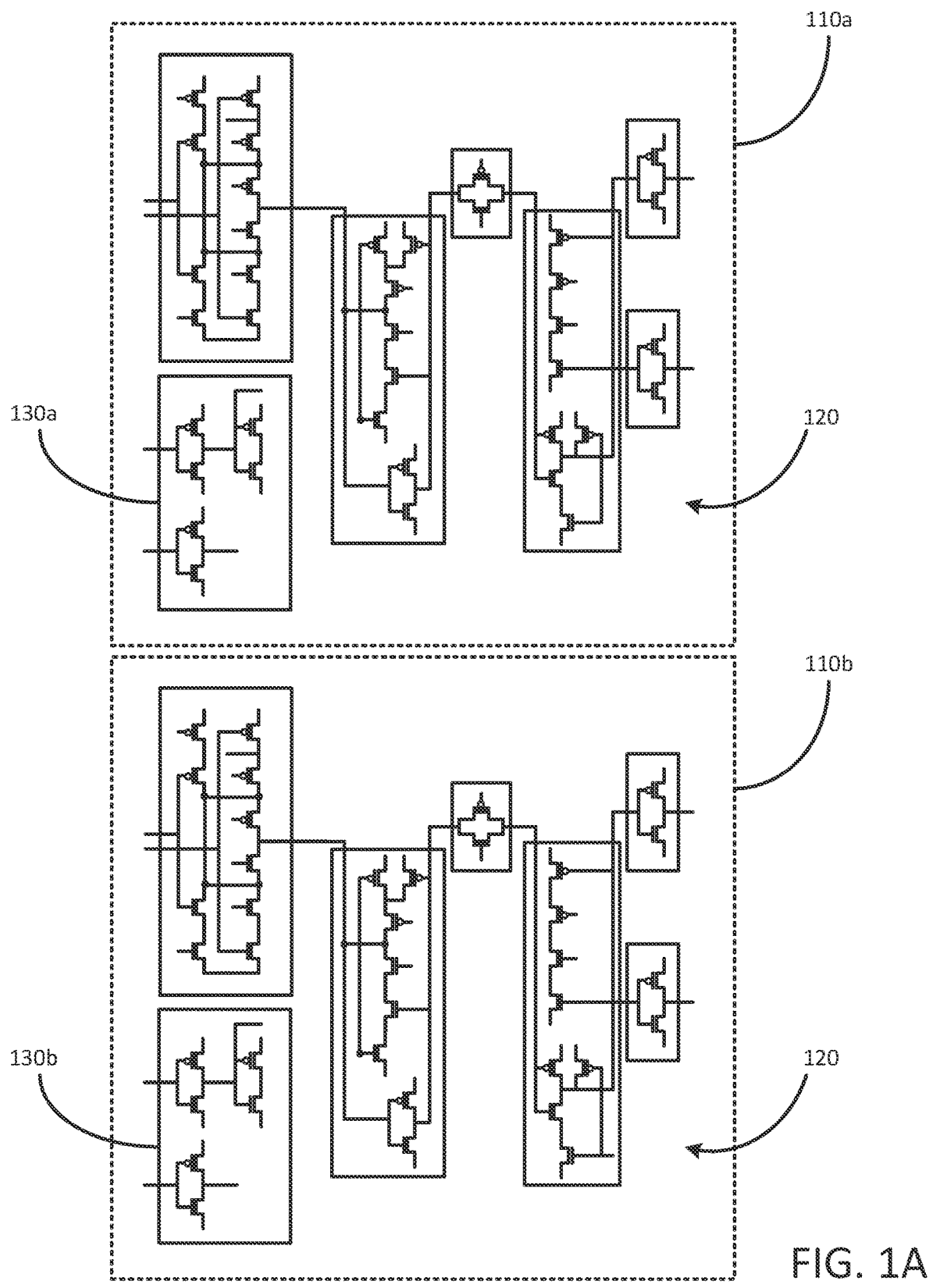
FIGS. 1A and 1B illustrate the area benefit obtained by sharing a control block between multiple flip-flops when combined in a FlexMBFF, according to embodiments of the present disclosure.

Aspects of the present disclosure relate to on-the-fly multi-bit flip-flop (MBFF) generation. MBFFs are important design concepts for power reduction in modern cell-based designs. Fixed or "pre-built" MBFFs defined in logic libraries may be pre-built elements. For example, an MBFF may be modeled and constructed as a single macro cell, so the components of the MBFF are fully defined in both circuit schematic and layout.

Using pre-built MBFFs reduces choice in improving chip level design. For example, consider a library having three drive strengths per cell on a semiconductor process with seven different voltage threshold (VT) transistor devices. For a given circuit topology and bit-count, this library will have MBFFs of three drive strengths per VT, or a total of twenty-one different MBFFs.

The present disclosure teaches a structure and modeling scheme referred to herein as "FlexMBFF," (e.g., a flexible MBFF) which enables on-the-fly assembly of exponentially more MBFFs. As used herein, "on-the-fly" assembly is contrasted against monolithic assembly so that a designer can select and adjust individual elements of an MBFF "on-the-fly" to suit design parameters instead of selecting a pre-built MBFF as a single monolithic element from a library. The FlexMBFF approach further permits construction of MBFFs with any specified bit-count, further improving upon current libraries which provide only a subset of bit counts—for example, 2, 4, 8, and 16. Moreover, the FlexMBFF approach permits incrementally changing an existing MBFF by adding or removing one or more flip-flop bits, or modifying one or more flip-flop bits or the control block, without completely dismantling the MBFF. Accordingly, a FlexMBFF defines a separate control block that contains the control circuitry that can be shared among the flip-flop bits, thus allowing individual flip-flop bits to be altered without affecting the layout of other flip-flop bits or control circuitry, and for the control circuitry to be altered without affecting the layout of the flip-flop bits. As used herein, a flip-flop bit generally refers to circuitry (or a representation of circuitry) used to implement a single-bit flip-flop without the control circuitry.

For a fixed MBFF, after initial mapping (e.g., banking) of individual flip-flops into pre-built MBFFs, design performance associated with mapping of one or more flip-flop bits may degrade in course of the design flow. The degradation may happen during placement if MBFF mapping precedes placement. The degradation may also happen any time after MBFF mapping, such as during clock insertion, timing/power improvements, and routing. Design tools try not to de-bank bits (e.g., separating bits and other circuitry previously combined into a MBFF), compensating for the degradation by improving logic surrounding a flip-flop. De-banking should be avoided as de-banking may cause perturbation to the design, which degrades the quality of the resulting layout. Likewise, tools also avoid re-banking fragmented bits into a new MBFF (e.g., combining bits and other circuitry from a previously separated MBFF or unassociated circuit elements) after de-banking because that too causes design perturbation due to the large sizes of MBFFs (e.g., forcing other layout elements to be repositioned). The present disclosure enables maintaining design performance associated with a mapping with less perturbation and reducing computationally expensive de-banking and re-banking calculations.

The present disclosure teaches a structure and method for efficient on-the-fly construction of customized MBFFs using interconnecting block style assembly. There are different types of building blocks described herein such as control blocks and FlexMBFF bit-slice blocks.

A FlexMBFF control block (e.g., a shared logic block) contains circuits shared between flip-flops and used to drive bits (e.g., a digital node) in the MBFF. These bits may include a clock (CK) node, a complement clock ($\overline{CK}$) node, scan-enable (SE) node, and complement SE ($\overline{SE}$) node.

There are other optional implementations for the control block. For example, the control block may contain delay elements (e.g., a clock delay block or an integrated clock gating block configured to selectively disable at least one clock signal for at least one of the plurality of flip-flops) in the clock path to enable injection of useful clock signal skew. The control block may also contain an integrated clock gating logic that may be used to gate the flop bits in the MBFF. In other embodiments, the control block can implement non-critical scan enable buffers using low power (higher VT) devices and may have a lower drive strength as compared to a clock signal. In some implementations, the control block may be split into two cells, one to implement a clock splitter and one to handle scan enable. In another example, the control block may be included in other MBFF topologies that result in additional or different shared signals being implemented in the control block, such as the conditional clock generation for flip-flops with scan enable described.

A FlexMBFF bit-slice block (otherwise called a FF bit) can be understood as a single bit flip-flop that has been stripped of its scan enable and clock buffers. These buffers may be migrated to a FlexMBFF control block described below. A FlexMBFF bit-slice block contains the data and scan enable input of the flip-flop, plus inputs to receive CK, $\overline{CK}$ and $\overline{SE}$ inputs from the FlexMBFF control block. The FlexMBFF bit-slice block has an output (Q output) and/or output complement ($\overline{Q}$ output). If the Q output does not also serve as a scan output, there may also be a dedicated scan output pin. The concepts described herein may be generalized to more complex flip-flops by implementing, in a FlexMBFF control block, the shared circuits driving the flip-flops, and removing the corresponding single bit flip-flop circuits from the flip-flops to create the FlexMBFF bit-slice blocks, as described in more detail herein.

Although generally discussed herein as including multiple bit-slice blocks, a FlexMBFF can be defined with one bit-slice block. For example, a designer can remove a bit-slice block from an existing instance of a 2-bit FlexMBFF to create a 1-bit FlexMBFF that includes the control block and the remaining bit-slice block. In another example, a designer can convert a pre-built single-bit flip-flop into a 1-bit FlexMBFF. In various embodiments, a designer can add additional bit-slice blocks to a 1-bit FlexMBFF (e.g., to create a 2-bit FlexMBFF), use the 1-bit FlexMBFF instance as a basis for a flexMBFF family with any number of bits, or keep the 1-bit FlexMBFF in the circuit layout. Accordingly, a FlexMBFF can include one or more bits and the number of bits included in a FlexMBFF may vary as the design progresses through different stages of the chip design flow.

Figure 1B:
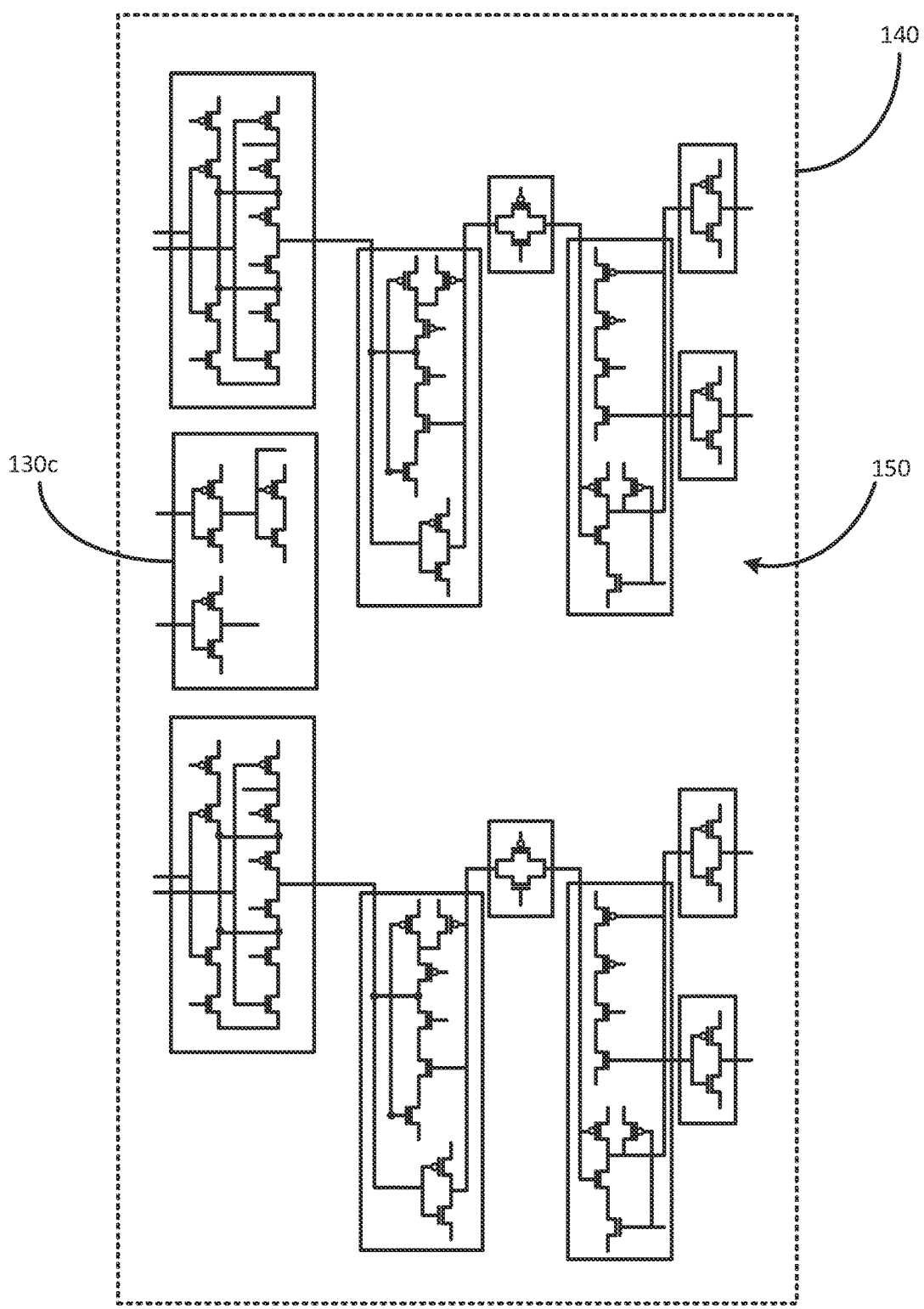

FIGS. 1A and 1B illustrate the area benefit obtained by sharing a control block between multiple flip-flops when combined in a FlexMBFF, according to embodiments of the present disclosure.

FIG. 1A shows a first single-bit flip-flop 110a and a second single-bit flip-flop 110b, used to implement a FlexMBFF. Each of the single-bit flip-flops 110a/110b include various flip-flop components 120. The flip-flop components 120 may be used, for example, to store a bit in memory, clear the memory, read the bit out of memory, etc. Included in each of the single-bit flip-flops 110a/110b is a separate set of control components for managing shared signals for the flip-flops (e.g., CK, SE)—the respective first control block 130a and second control block 130b.

FIG. 1B shows an implementation with the single-bit flip-flops 110a/110b being combined into a FlexMBFF 140 with a shared control block 130c. The flip-flop components 150 from the two single-bit flip-flops 110a/110b are included in the FlexMBFF 140 (e.g., the combined flip flop components 120 from FIG. 1A), but the FlexMBFF 140 includes just one shared control block 130c that implements the functions of the first control block 130a and the second control block 130b. Stated differently, the single-bit flip-flops 110a/110b each include a separate set of control components (e.g., the sub-circuits used to drive the respective flip-flops 110) in respective control blocks 130a/130b, whereas the FlexMBFF 140 includes one set of control components (e.g., the shared control block 130c including the sub-circuits used to drive the flip-flops of an MBFF) that is shared between the flip-flop components 120. This signals generated by the control blocks 130 can include at least one: of clock signals (e.g., CK and $\overline{CK}$), set or reset signals, and scan enable signals, or the like depending on the type of flip-flops being driven.

A FlexMBFF instance of a specified bit-count may be custom designed by selecting each flip-flop bit independently from the other flip-flop bits, selecting a control block of desired characteristics (e.g., implemented with specified VT transistors and specified drive strength to achieve target performance for the flip-flop bits in the FlexMBFF instance). The FlexMBFF instance layout may be assembled by allowing snapping (e.g., tiling) of the selected control block and flip-flop bit-slice blocks such that connections to all flip-flop bits from the control block can be made with compact and predictable routes such as straight line connections.

As used herein, an instance refers to a single software-based representation of a real-world item. Accordingly, a FlexMBFF, if present multiple times in a circuit layout, will be represented in a software layout tool by a corresponding number of instances. Each instance of a given FlexMBFF refers to a given set of characteristics, but not necessarily the same layout. For example, a first software representation of a FlexMBFF with characteristic set X and a second software representation of a FlexMBFF with characteristic set X but with a different relative arrangement of the bit-slice blocks or flip-flop components 120, can be considered two instances of one MBFF. In contrast, if a first software representation of an MBFF includes a different quantity of bit-slice blocks, a different VT, a different transistor drive strength, or different flip-flop components 120 (e.g., different transistor types or flip-flop types) from a second software representation of an MBFF, the software representations are two instances; one of a first MBFF and one of a second MBFF.

Connections internal to the FlexMBFF instance may include connections for an $\overline{SE}$ node, CK node, and $\overline{CK}$ node from the control block to the bit-slice blocks, plus connections for set, and reset signals which may be primary inputs to the flip-flop bits. Optionally, one may have additional signals such as shifted CK/$\overline{CK}$ for useful skew. Optionally, one may also have conditional clocks for scan enable (e.g., per U.S. Pat. No. 9,729,128).

Global signals may be routed at a design level, as is the case with pre-built MBFFs. For non-stitched MBFFs (e.g., MBFFs without control signals routed internally between flip-flop bits), all scan-in and scan-out connections may remain global. Other global connections may include set/reset inputs to the MBFF, CK input to the MBFF, as well as D input and Q output of each flip-flop bit. In various embodiments, mixed scan out mechanisms may be supported so that incoming and internal flip-flop bits have a shared scan out and outgoing flip-flop bits have dedicated scan outs. For internally scan-stitched MBFFs, the scan may be stitched between successive bits, with scan in to the first flip-flop bit and scan out from the last flip-flop bit being global connections. This stitching may be done after placing all bit-slice blocks and the control block of the FlexMBFF, with a chip level router, a pattern-must-join (PMJ) style pattern routing, or by abutment. Using PMJ style pattern routing and abutment may be possible with careful layout of the control block and flip-flop bit-slices to enable such connections.

Figure 2:
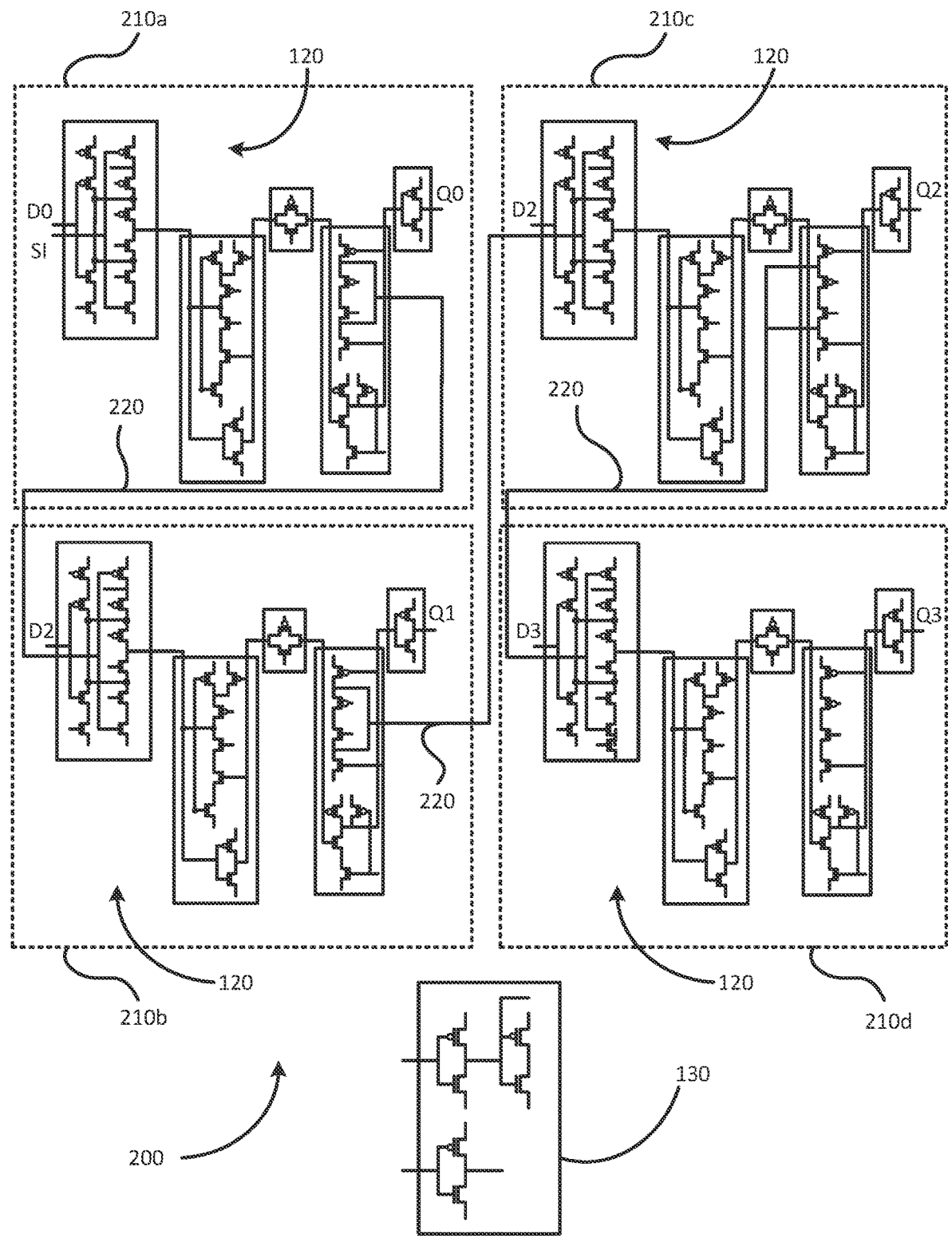
FIG. 2 illustrates a schematic of a 4-bit positive edge triggered scan D-flip-flops, according to embodiments of the present disclosure.

FIG. 2 illustrates a schematic of 4-bit positive edge triggered scan D-flip-flops having stitched scan-in, and Q-only output (e.g., a flip-flop without $\overline{Q}$ output), according to embodiments of the present disclosure. As shown, flip-flop components 120 may be grouped into a first flip-flop bit 210a, a second flip-flop bit 210b, a third flip-flop bit 210c, and a fourth flip-flop bit 210d to provide a 4-bit FlexMBFF 200. In other embodiments, more than or fewer than four flip-flop bits can be included in one FlexMBFF. A shared control block 130 is included that manages the shared signals for flip-flop components 120 across the various flip-flop bits, but the scan input (SI) signal is carried via a stitched connection 220 from the output of the first flip-flop bit 210a to the input of the second flip-flop bit 210b, from the output of the second flip-flop bit 210b to the input of the third flip-flop bit 210c, and from the output of the third flip-flop bit 210c to the input of the fourth flip-flop bit 210d. Accordingly, the flip-flop bits in a FlexMBFF may be independently operated from one another (e.g., as in FIG. 1B) or stitched together to chain the operation of one flip-flop bit to the operation of another flip-flop bit in the FlexMBFF (e.g., as in FIG. 2).

When tiling FlexMBFF bit-slice blocks and a FlexMBFF control block, shared pins may be aligned to enable predictable connections. For example, with straight routes on an upper metal layer, vias may be used for connection to pins on a lower layer, or pins located on the lower layers may be aligned such that they are collinear when tiled, allowing connection of the pins on the upper and lower layers by extending the pins. Horizontal and/or vertical spines may be implemented in the FlexMBFF bit-slice blocks and the FlexMBFF control block to be used during placement to facilitate alignment of pins.

Figure 3:
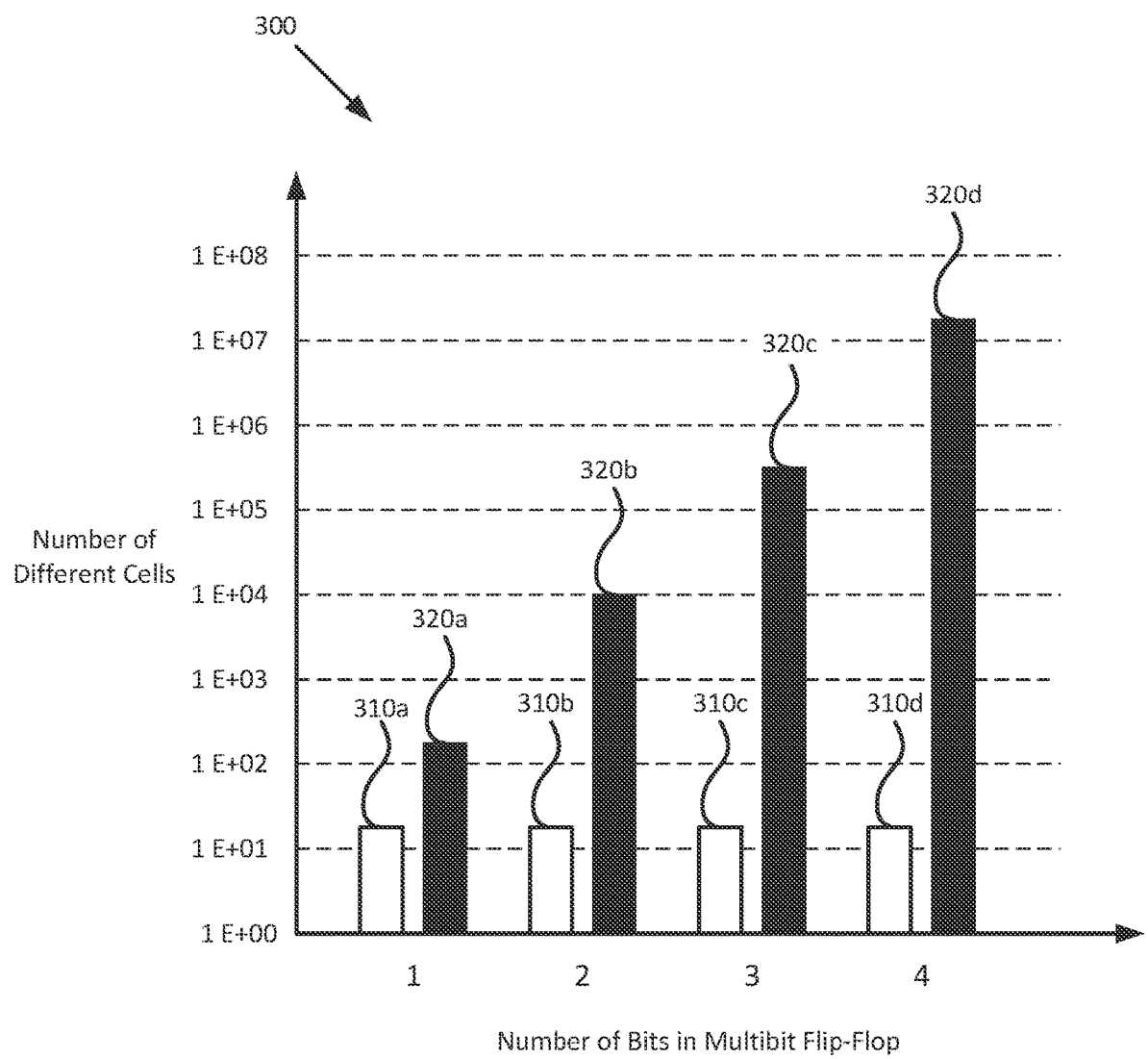
FIG. 3 is a histogram showing a number of multi-bit flip-flop (MBFF) cells that are possible for a single family of MBFF, according to embodiments of the present disclosure.

FIG. 3 illustrates a chart 300 comparing a number of flip-flop bits in a MBFF with a number of different cells for representing those flip-flops via pre-build libraries of MBFFs. A cell is a hierarchical representation of a set of one or more internal components that allows a designer to manipulate the set as a single entity at one level of hierarchical design and manipulate the internal components at a second level, In various embodiments, cells can include other cells, providing for tiered hierarchical design. The chart 300 illustrates for each of the example number of flip-flop bits in the MBFF (e.g., one, two, three, or four) a number of pre-built cells 310a-d held in a typical library and the number of potential cells 320a-d offered by a FlexMBFF architecture. Accordingly, the FlexMBFF architecture described herein offers significantly greater choice in flip-flop design versus the pre-built architecture, without having to store a large number of unique MBFF designs in memory.

The ability of the FlexMBFF architecture to generate a rich set of unique MBFFs may be illustrated using an example semiconductor process with seven VTs. For such a process, the FlexMBFF scheme enables construction of over 15 million unique 4-bit MBFFs if three different drive strengths are supported. Compared to that, a pre-built MBFF offering in a library may have three drive strengths for each VT, resulting in a total of twenty-one different unique MBFFs. The chart 300 in FIG. 3 compares the possibilities in a logarithmic scale and shows that the number of potential FlexMBFF's instances which can be generated grows exponentially as the number of flip-flop bits included in the MBFF grows. Accordingly, the benefits of using FlexMBFF can be realized in situations with more than or fewer than 4 flip-flop bits and with more than or fewer than the exemplary number of VTs and drive strengths. Of course, a wider selection of drive strengths is possible, resulting in an even greater variety of unique customized MBFFs. For very large bit counts, the control block may include buffering circuits for set, reset, and scan enable in the control block instead of (or in addition to) applying these inputs directly to the flip-flop bit-slice blocks. Likewise, for small bit counts, the control block may include only one clock inverter to generate $\overline{CK}$ and use the primary clock input to directly drive the CK pins of all flip-flop bit-slice blocks.

Performance, power and reliability considerations may reduce the range of control block drive strengths that can be used for a given set of flip-flop bit-slice blocks. Likewise, for a given control block drive strength, the total load presented by all the flip-flop bit-slice blocks in the FlexMBFF instance may be reduced to facilitate hazard free operation and good performance.

When a target performance cannot be met, tools may re-map timing critical flip-flop bits in MBFFs and map the flip-flop bits to higher performance flip-flops/MBFFs. This process is called de-banking, and results in one or more flip-flop bits reverting to single bit flip-flops, with the remainder mapped to smaller MBFFs. Tools may subsequently re-cluster de-banked fragments of one or more MBFFs into a new set of MBFFs, a process called re-banking. Banking, de-banking, and re-banking are computationally expensive and cause large perturbations in a design which degrades quality of results (QoR). Incremental placement of new single and/or multi-bit flip-flops cause perturbation in chip layout, resulting in displacement of other cells in their vicinity. This may disturb the clock distribution to the affected flip-flops, degrading performance due to adverse clock skew. A typical banking, de-banking, or re-banking operation on a 4-bit prebuilt MBFF results in re-wiring 30+ nets connected to the flip-flops, with the impact of placement perturbation affecting scores to hundreds of cells, impacting thousands of timing paths.

The present disclosure reduces reliance on de-banking. Instead, individual flip-flop bits may be re-mapped to a faster FF bit, or removed from a FlexMBFF instance while maintaining the other flip-flop bits of the FlexMBFF. Likewise, a new flip-flop bit may be added to an existing FlexMBFF instance without changing the other flip-flop bits. The control block drive strength can be adjusted to account for the change in load after adding and/or removing flip-flop bits. The control block speed can also be adjusted up or down to reflect the needs of all FF bits in the FlexMBFF instance.

The present disclosure improves the ability to maintain the performance of an existing FlexMBFF instance by enabling incremental modifications with low design perturbation. The on-the-fly construction enables change in VT and/or drive strength of any flip-flop bit or the control block independently, which localizes the change, thus reducing design perturbation. Removal of any flip-flop bit, or addition of a new flip-flop bit are simple operations which have virtually no impact on the locations of other flip-flop bits, reducing re-routing and perturbation. Performance can be maintained by tuning the control block drive strength, which has little impact on placement of the modified control block or adjacent cells, and no impact on the placement of flip-flop bits in the MBFF.

Figure 4:
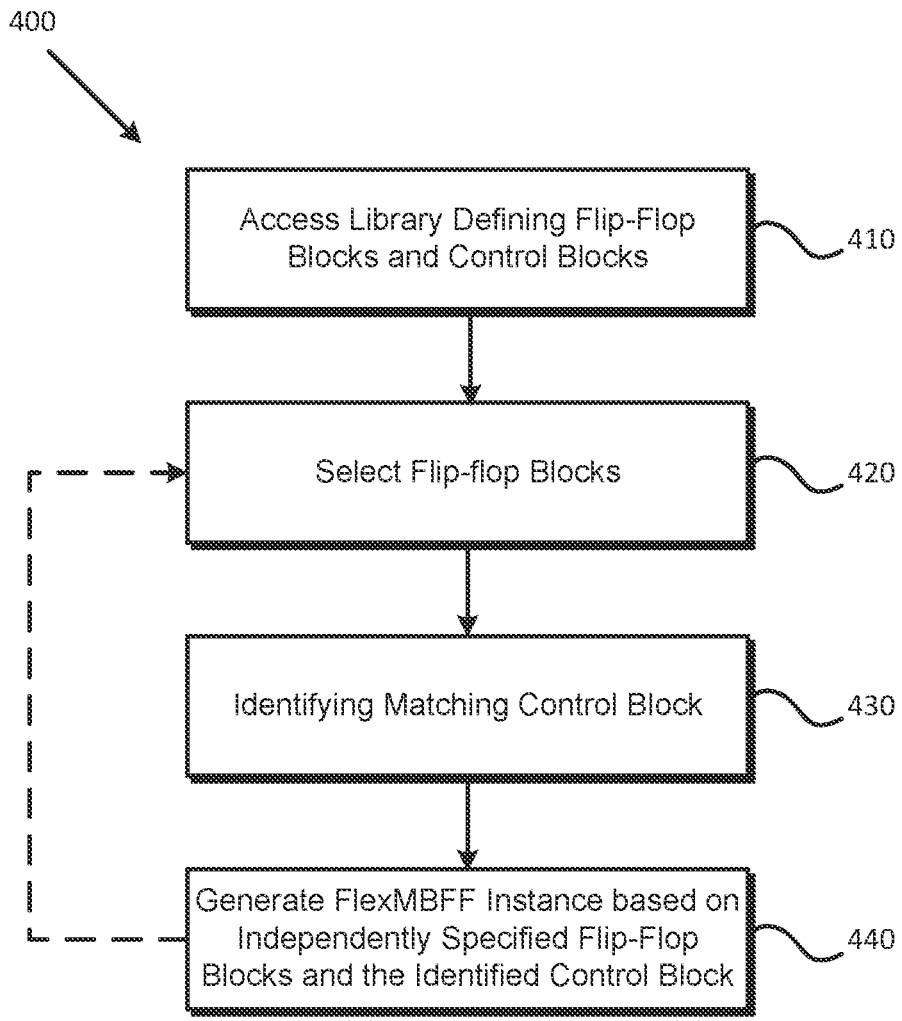
FIG. 4 is a flowchart of a method for providing an MBFF instance, according to embodiments of the present disclosure.

FIG. 4 is a flowchart of a method 400 for providing a MBFF, according to embodiments of the present disclosure. Method 400 may be performed by, for example, one or more processors, such as those illustrated in the computing system 1000 described in greater detail in regard to FIG. 10 Method 400 optionally begins at 410 (if performed in a first iteration of method 400) of at 420 (if performed for a subsequent iteration of method 400).

At 410, the one or more processors of the computing system access a library or other database including definitions for one or more bare flip-flops as bit-slice blocks and one or more control blocks to define a customizable MBFF (also referred to herein as a FlexMBFF). In various embodiments, the library or database can be sub-divided into "families" of FlexMBFFs to describe the component blocks for MBFF that use different sets of control signals. The user can access the various blocks for customizing an MBFF in addition to or instead of selecting a pre-built MBFF. For example, if the user selects a pre-built MBFF and later decides to customize the pre-built MBFF (e.g., by adding a flip-flop bit, removing a flip-flop bit, modifying the operational characteristics of a flip-flop bit, or customizing the control block), the tools may automatically substitute the pre-built MBFF with a FlexMBFF instance matched to the pre-built MBFF before proceeding with customization of the FlexMBFF. In various embodiments, the selection of the at least two flip-flop blocks (per 420) and the identification of the control block (per 430) is based on the definitions included in the library of another database.

At 420, the one or more processors of the computing system receive a selection for at least two flip-flop blocks from a plurality of candidate flip-flop blocks. The design and layout tools may receive selection of at least two flip-flop blocks (also referred to as bit-slice blocks) either in conjunction with a specified control block, or with a specification of desired power and performance in conjunction with an unspecified control block. In various embodiments, when a user/tool selects individual bare flip-flop bit-slice blocks for inclusion in a FlexMBFF instance (e.g., from a library physical synthesis tool), the user/tool can specify the values for various characteristics of the bare flip-flop represented by the flip-flop block, including a drive strength, a voltage threshold for the transistors defined therein, and timing delays to receive various signals from a control block.

The definition for the flip-flop block includes the characterizations for the transistors included therein, including the power consumption and signal delays imposed by the transistors. A user can specify different operational characteristics for each of the selected flip-flop blocks, which can include the same or different values for each operational characteristic in various embodiments. In further embodiments, a user can re-specify or update the operational characteristics of an already placed flip-flop block regardless of whether that flip-flop block was originally placed as a bare flip-flop in a flip-flop block as part of a FlexMBFF or as part of a pre-built MBFF (replacing the pre-built MBFF with a FlexMBFF). Accordingly, each flip-flop block of the at least two flip-flop blocks includes independently selectable characteristics from one or more other flip-flop blocks of the at least two flip-flop blocks. In various embodiments, the characteristics that are independently selectable for each of the at least two flip-flop blocks include at least one of: a voltage threshold of one or more transistors of each of the at least two flip-flop blocks; or a time delay for receiving signals from the control block.

At 430, the one or more processors of the computing system identify a control block from a plurality of candidate control blocks, the control block being identified based on characteristics of the at least two flip-flop blocks. In various embodiments, design and layout tools identify a control block from the plurality of candidate control blocks defined in the library or database that matches the independently selected characteristics of the at least two selected flip-flop blocks. In various embodiments, the definitions for the control block include characterizations of a signal generator for a clock signal and an inverse clock signal (e.g., a clock splitter), a set signal buffer or generator and/or scan enable buffer, and a reset signal buffer and/or generator. The tools select the control block that most closely meets or exceeds the operational specifications of the bare flip-flops in the flip-flop blocks selected and specified at 420.

For example, when the voltage threshold for the individual flip-flop blocks is set to x V, the control block is set to provide signal with amplitudes of at least x V (Volts). Because the individual flip-flop blocks have independently selectable characteristics, the operational specifications that the tool sets the control block to are based on the individual characteristics of the flip-flop blocks. As used herein, the operational specifications refer to the value or values used to select the control block, which can be the highest value of the individual flip-flop blocks, the lowest value from the individual flip-flop blocks, or a combined value from the flip-flop blocks. For example, when a first flip-flop block has a drive strength of x V and a second flip-flop block has a drive strength of 2x V, the control block is set of provide at least 2x V as a driving voltage. In another example, when a first flip-flop block can tolerate a time delay of up to y ms (milliseconds) for control signals, and a second flip-flop block can tolerate a time delay of up to 2y ms, the control block is set to provide control blocks with no more than y ms of delay.

In various embodiments, as the user updates the number of bits included in the MBFF or adjusts the characteristics of the corresponding bare flip-flops in the flip-flop blocks, (e.g., repeating or performing different operations at 420) the operation at 430 repeats to re-identify the appropriate control block to use in the MBFF including those bare flip-flops.

At 440, the one or more processors of the computing system generate a multi-bit flip-flop instance based on the selected at least two flip-flop blocks and the identified control block as identified. In various embodiment, the design and layout tools generate a FlexMBFF instance based on the selected and independently specified flip-flop blocks (per 420) and the identified control block (per 430). In various embodiments, generating the instance for the FlexMBFF treats each of the flip-flop blocks and the control block as separate cells in the layout.

Generating the multi-bit flip-flop instance may include placing the at least two flip-flop blocks and the control block in a layout; and routing interconnections between the control block and the at least two flip-flop blocks. The cells provide a layer of representation that allows the tools to tile and snap together the individual blocks during placement and make (optionally, straight line) routing connections between the cells. These routing connections provide for predictable power and timing analysis of the signals transmitted by the control block to the individual flip-flop blocks (or between flip-flop blocks). In various embodiments, the internal connections in the MBFF instance are routed after a placement phase of a chip design flow and before auto-routing of global signals.

Method 400 may then conclude or return to 420 in response to a user adding, removing, or changing the operational characteristics of a flip-flop included in the FlexMBFF. After concluding, a fabricator can use a circuitry layout including one or more emulated MBFFs (simulated according to method 400) to fabricate an integrated circuit that includes one or more MBFFs based on the emulation versions (e.g., the instances) of those MBFFs.

Figure 5:
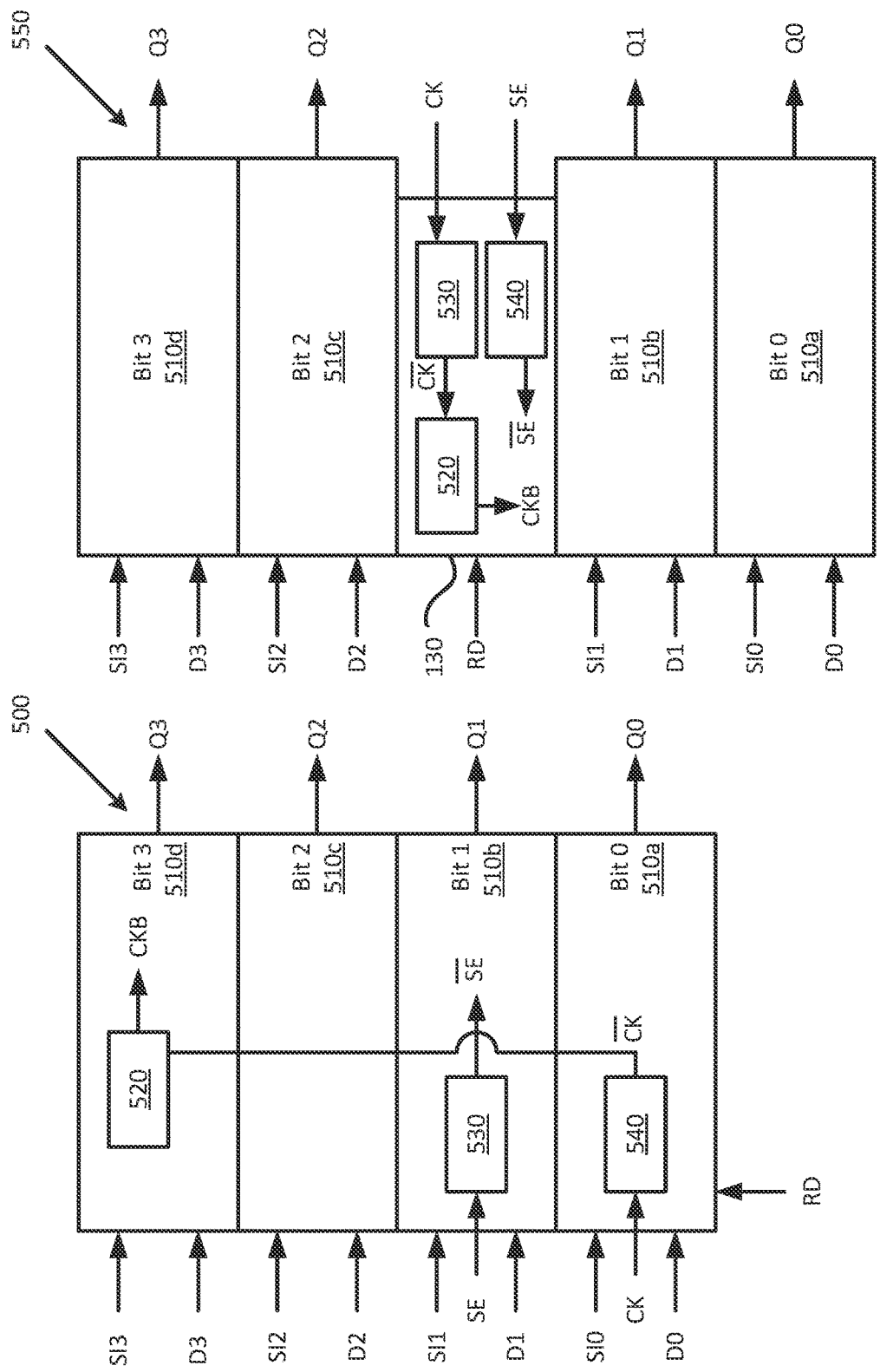
FIG. 5 illustrates a comparison between a fixed MBFF and a FlexMBFF, according to embodiments of the present disclosure.

FIG. 5 illustrates a prebuilt MBFF 500 and a FlexMBFF 550, according to embodiments of the present disclosure. Each of the MBFFs include four flip-flop bits 510a-d that receive respective scan-input (SI) and data (D) inputs to produce a respective output (Q). Various shared signals are connected to each flip-flop bits 510a-d internally to the MBFF, such as, for example RD, $\overline{CK}$, CKB (the complement of $\overline{CK}$, potentially with imparted skew), SE, and $\overline{SE}$. The flip-flop bits 510a-d include the various logic gates and other components for storing, retrieving, and clearing one flip-flop bit in the respective MBFF.

The prebuilt MBFF 500 includes the hardware (e.g., inverters, logic gates) for receiving and manipulating these shared signals in the various flip-flop bits 510a-d. For example, the RD signal is received at the first flip-flop bit 510a and is shared with the other flip-flop bits 510b-d, a $\overline{C}$ $\overline{K}$-to-CKB inverter 520 is included in the fourth flip-flop bit 510d, an SE-to-$\overline{SE}$ inverter 530 is included in the second flip-flop bit 510b, and a CK-to-$\overline{CK}$ inverter 540 is included in the first flip-flop bit 510a.

In contrast, the FlexMBFF 550 includes a control block 130 for receiving and manipulating shared signals before providing those signals internally to the various flip-flop bits 510a-d. For example, the control block 130 receives all of the RD, CK, and SE signals, and processes those signals via the $\overline{CK}$-to-CKB inverter 520, the SE-to-$\overline{SE}$ inverter 530, and the CK-to-$\overline{CK}$ inverter 540 in a consolidated location. In turn, the various flip-flop bits 510a-d included in the FlexMBFF 550 are bit-slice blocks that include the internal components for storing, retrieving, and clearing a value for a bit in memory. Additionally, the bit-slice blocks include traces or input/output paths to receive the shared signals from the control block 130 or another bit-slice block and to provide those shared signals to another bit-slice block.

Figure 6:
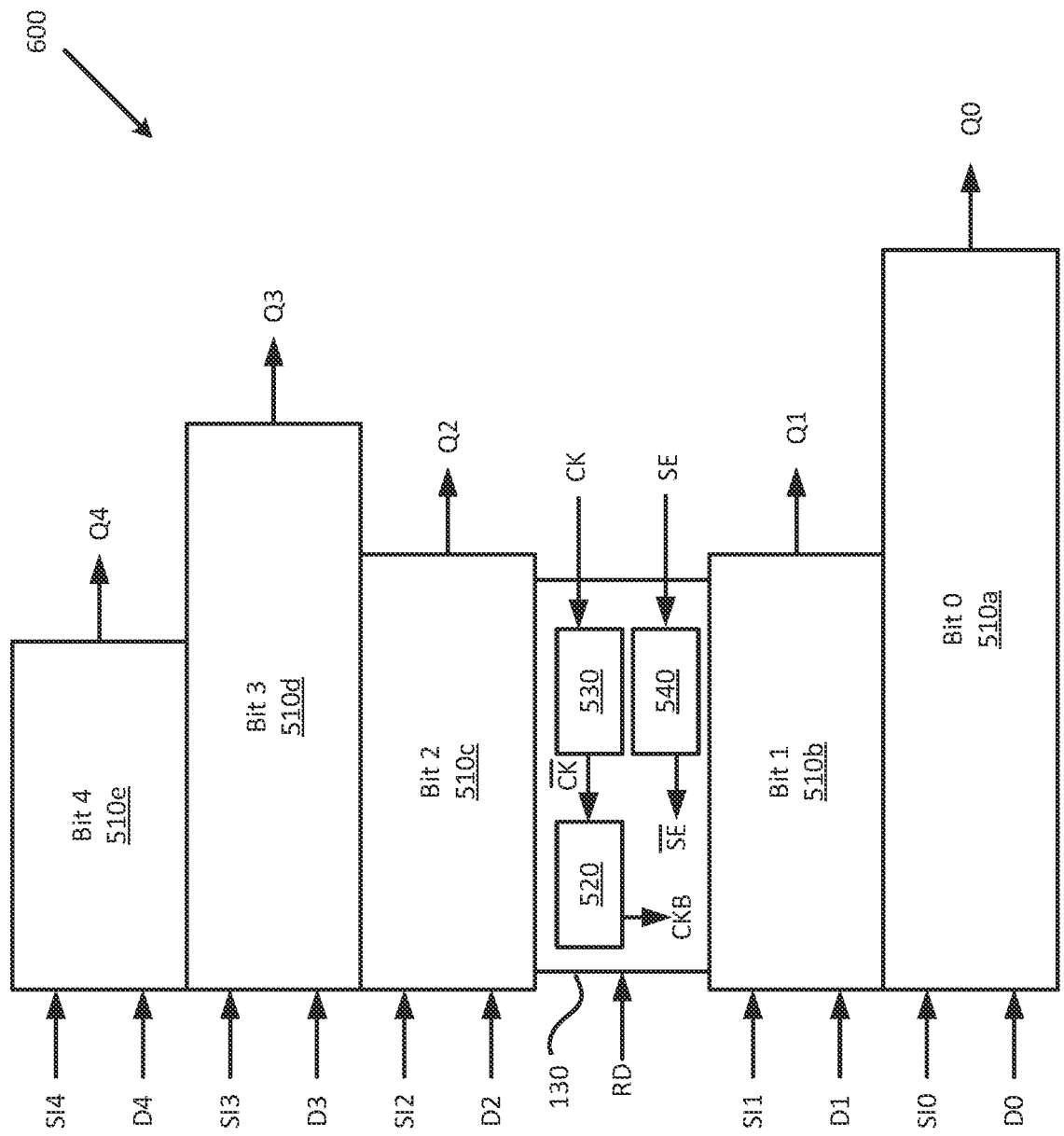
FIG. 6 illustrates an example 5-bit multi-voltage threshold mixed drive strength MBFF, according to embodiments of the present disclosure.

FIG. 6 illustrates an example 5-bit multi-VT mixed drive strength MBFF 600, according to embodiments of the present disclosure. In the multi-VT mixed drive strength MBFF 600, each of the flip-flop bits 510a-d (and the respective components thereof) may use the same or a different voltage threshold (VT) and/or drive strength from the other flip-flop bits 510a-d, while still using a shared control block 130 for handling shared signals across the flip-flop bits 510a-d. For example, the control block 130 (similarly to the control block 130 described in relation to FIG. 5) receives the RD, CK, and SE signals, and processes those signals via the $\overline{C}$ $\overline{K}$-to-CKB inverter 520, the SE-to-$\overline{SE}$ inverter 530, and the CK-to-$\overline{CK}$ inverter 540 in a consolidated location before providing those signals to the individual flip-flop bits 510a-d. Each of the flip-flop bits 510a-d can be set to a given drive strength or VT independently of how the other flip-flop bits 510a-d are set. Accordingly, the second flip-flop bit 510b and the third flip-flop bit 510c may have identical values set for drive strength and VT, and the first flip-flop bit 510a, fourth flip-flop bit 510d, and fifth flip-flop bit 510e may have unique values (in the MBFF 600) for drive strength and VT.

FIGS. 7A-7D are charts 700a-d that illustrate delay curves and slew curves as a function of load for clock drivers in the control block of an MBFF, according to embodiments of the present disclosure. The FlexMBFF architecture enables easy physical assembly of all customized MBFFs on-demand without generating (and storing) all possible MBFF permutations. Stated differently, the FlexMBFFs are not pre-assembled in the FlexMBFF architecture, but are generated on-the-fly for use. The FlexMBFF architecture also enables on-demand timing and power characterization of all MBFFs without pre-characterizing all possible MBFF permutations.

Figure 7A:
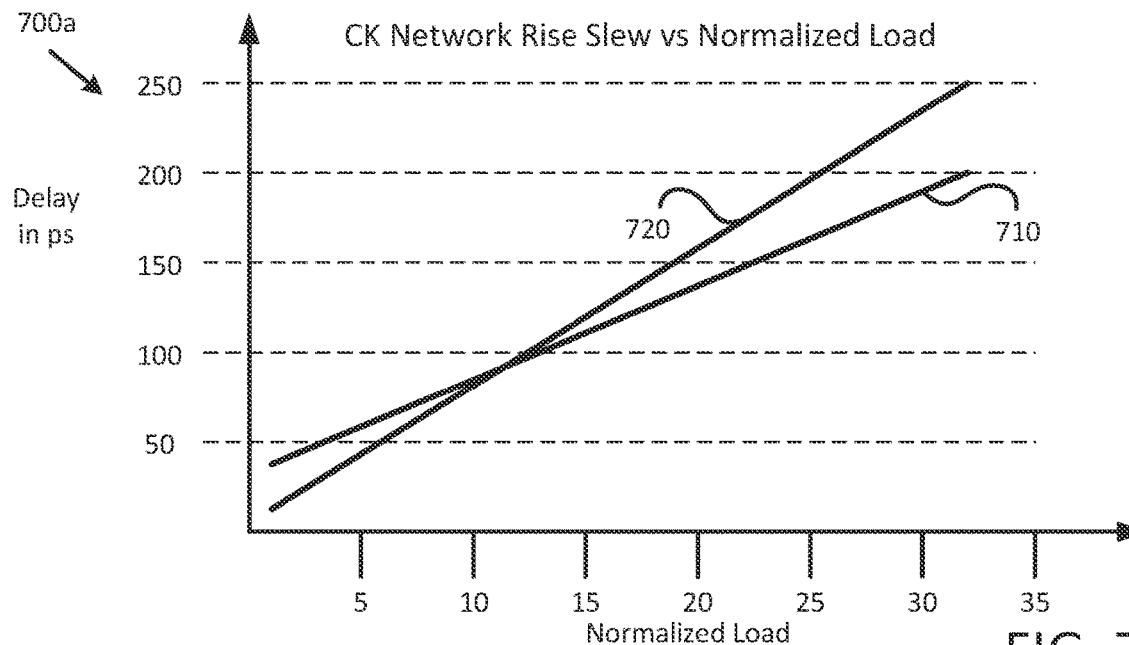
FIGS. 7A-7D illustrate delay and slew curves as a function of load for clock drivers in a control block of an MBFF, according to embodiments of the present disclosure.
Figure 7B:
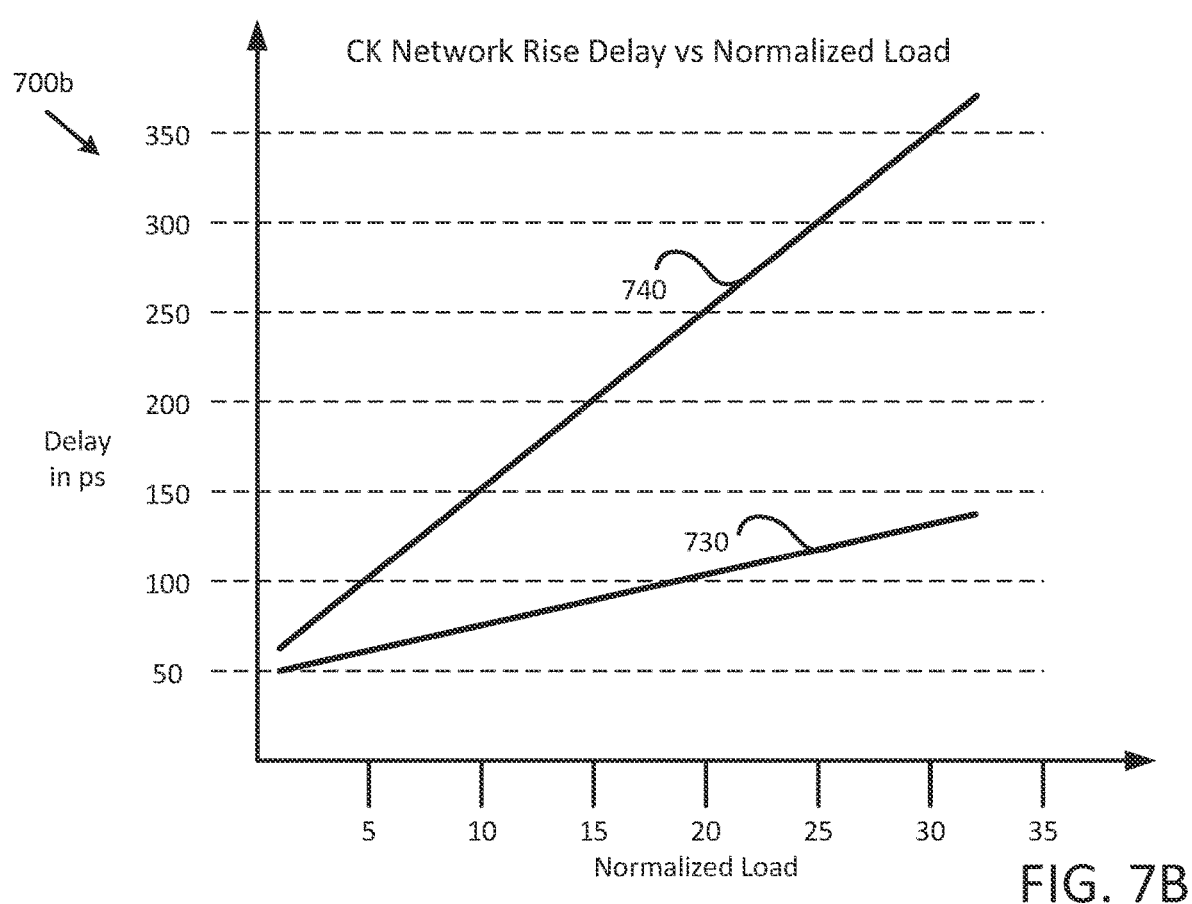
Figure 7C:
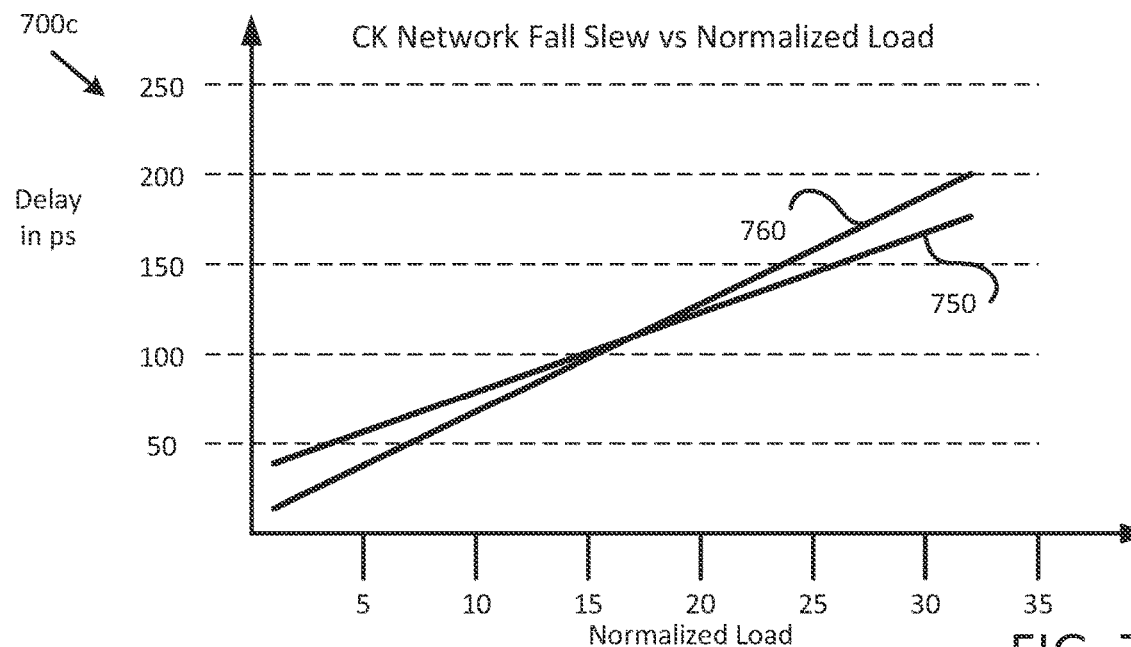
Figure 7D:
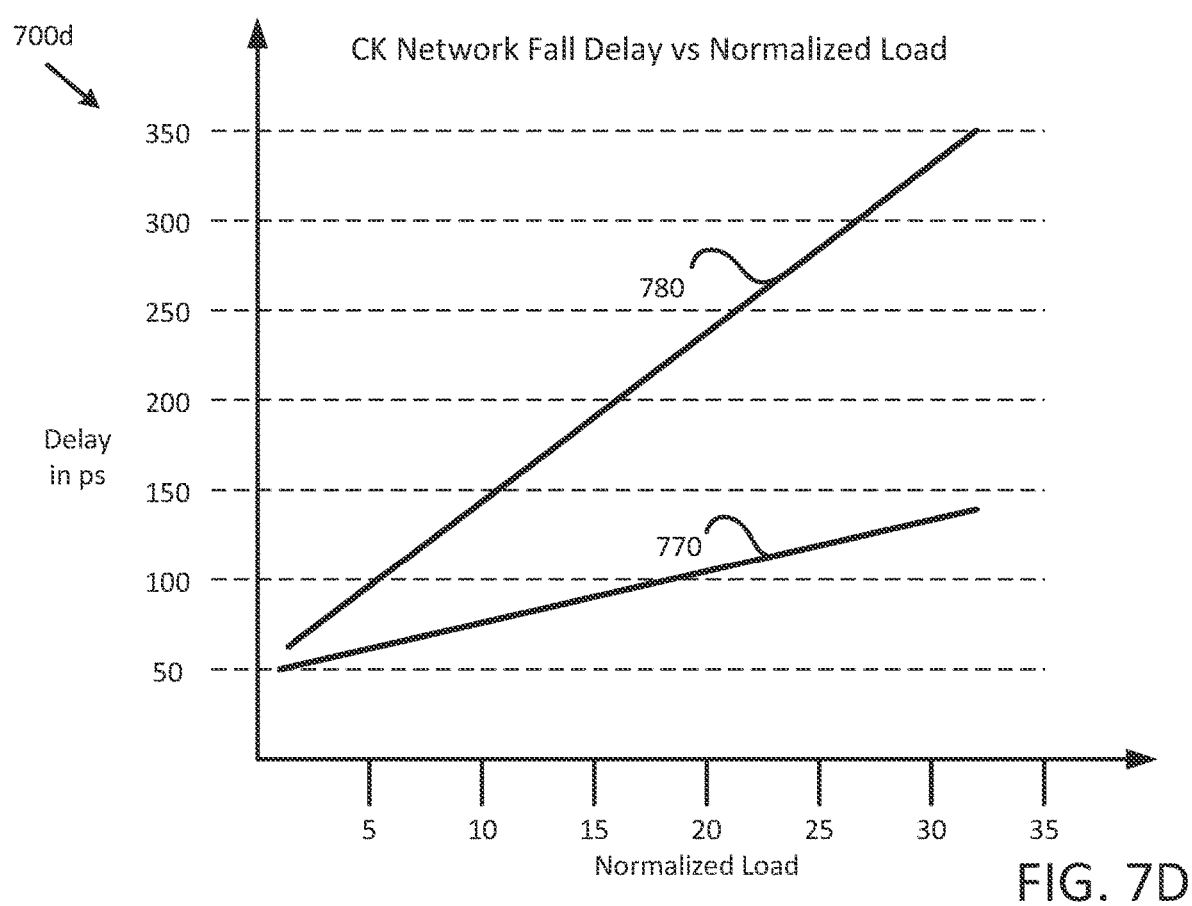

The first chart 700a in FIG. 7A illustrates clock network rise slew as a function of normalized load on a clock inverter curve 710 and a clock buffer curve 720. The second chart 700b in FIG. 7B illustrates clock network rise delay increases measured with corresponding increases in the normalized load on a clock inverter curve 730 and a clock buffer curve 740. The third chart 700c in FIG. 7C illustrates clock network fall slew increases measured with corresponding increases in the normalized load on a clock inverter curve 750 and a clock buffer curve 760. FIG. 7C illustrates clock network fall delay increases measured with corresponding increases in the normalized load on a clock inverter curve 770 and a clock buffer curve 780.

In at least one embodiment, the delays and slews from the control block to bit-slice blocks plotted in the charts 700a-d in FIGS. 7A-7D were found to depend on the total loads on the control block outputs. In particular, the delays and slews are largely independent of the location of the bit-slice blocks relative to the control block, and of the distribution of the total load across the bit-slice blocks. Stated differently, a first bit-slice block connected directly to the control block sees the same delays and skews as a second bit-slice block connected indirectly to the control block (e.g., through the first bit-slice block). The timing and power of the bit-slice blocks are also independent of the locations of the bit-slice blocks, as the timing and power behavior depends solely on the control block, input slews and total output loads on the control block, input slews on the bit-slice block, and loads on the bit-slice outputs. The characterization efficiency is further improved by the linear behavior of the control block circuits relative to the input slew and total load. Accordingly, simulation-based verification of this behavior for up to 32 bit-slice blocks indicates that this linear behavior continues with higher bit counts, and thus higher bit counts are possible for use with FlexMBFFs with predictable results.

Figure 8:
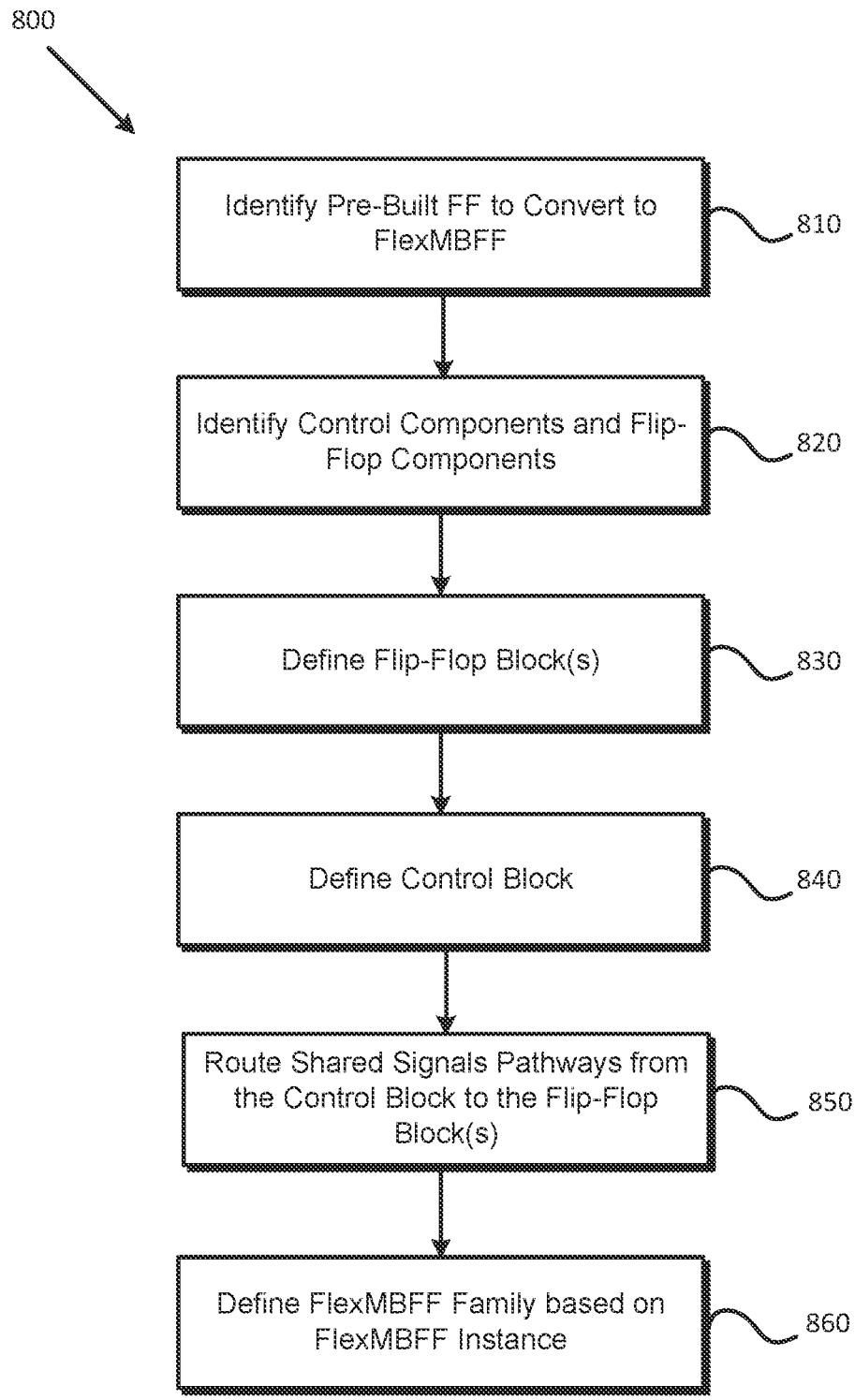
FIG. 8 is a flowchart of a method for converting a fixed MBFF instance into a FlexMBFF instance, according to embodiments of the disclosure

FIG. 8 is a flowchart of a method 800 for converting a pre-built FF instance into a FlexMBFF instance, according to embodiments of the present disclosure. The method 800 may be performed by, for example, one or more processors, such as those illustrated in the computing system 1000 described in greater detail in regard to FIG. 10. In various embodiments, the FF instance identified to convert is a single-bit FF, while in other embodiments, the FF instance identified to convert is a pre-built MBFF (e.g., having at least two bits defined therein).

Method 800 begins at 810, with the one or more processors identifying a pre-built FF instance to convert into a FlexMBFF instance. In various embodiments, the identification is made in response to a determination to de-bank and re-bank the pre-built FF instance, a determination to perform a re-layout of the circuit layout in which the pre-built FF is provided, or a command to convert the pre-built FF to a FlexMBFF. In various embodiments, the command to convert the pre-built FF can be for a specific instance or can include using the converted FlexMBFF instance as a basis for a family of FlexMBFFs (as discussed in greater detail in regard to 870)

At 820, the one or more processors (e.g., via a layout tool implemented via the one or more processors or other design tool used in the placing, routing, and synthesis of a circuit layout) identifies the control components and the flip-flop components in the pre-built FF instance identified at 810. The control components include various components used to receive, route, and manipulate signals used by the one or several flip-flops in the pre-built FF (e.g., CK. SE). The flip-flop components include the various components used to store a bit in memory, clear the memory, read the bit out of memory, etc. In various embodiments, the flip-flop components in each flip-flop can be the same as in the other flip-flops, but may also be different (e.g., having different VTs or drive strengths).

At 830, the one or more processors define a flip-flop block for each bit in the pre-built FF to contain a corresponding portion of the flip-flop components. For example, when converting a pre-built MBFF, the one or more processors define at least a first flip-flop block to contain a first portion of the flip-flop components and a second flip-flop block to contain a second portion of the flip-flop components, but may define further flip-flop blocks to contain additional portions of the flip-flop components based on the number of bits in the MBFF. For example, in a 2-bit MBFF, a first flip-flop block contains the first portion of the flip-flop components and a second flip-flop block contains the second portion of the flip-flop components (totaling all of the flip-flip components identified per 820). However, in a 4-bit MBFF, a first flip-flop block contains the first portion of the flip-flop components, a second flip-flop block contains the second portion of the flip-flop components, a third flip-flop block contains the third portion of the flip-flop components, and a fourth flip-flop block contains the fourth portion of the flip-flop components (totaling all of the flip-flip components identified per 820). Other examples can use more flip-flop blocks, each containing corresponding portions of the flip-flop components. Additionally, when converting a pre-built single-bit FF, the one or more processors define a flip-flop block to contain all of the flip-flop components.

At 840, the one or more processors define a control block to contain the control components. In various embodiments, the layout tool can select a pre-existing control block from a library that already includes the identified control components. Additionally or alternatively, the layout tool can generate a new control block to contain the identified control components, and can save the new control block to a library for later use.

At 850, the one or more processors route shared signals pathways from the control block to the one or more flip-flop blocks defined per 830 (e.g., to the at least the first flip-flop block and the second flip-flop block). The control block and each of the flip-flop blocks are defined as cells that the layout tool can place in the circuit layout separately from other cells. In various embodiments, the one or more processors treat each of the control block and the flip-flop blocks (defined per 830) and the control block (defined per 840) as separate cells in a circuit layout for the generation of the FlexMBFF instance. In various embodiments, the cells are defined as preconfigured circuit board layout structures with known input/output locations on the perimeters of the cells, allowing the layout tool to route shared signals between the cells by placing the cells into contact with one other (e.g., tiling the cells) or with predictable routes for signal traces between the cells if not placed into contact with one another. In various embodiments, the shared signal pathways can be routed directly from the control block to the flip-flop blocks or indirectly routed from the control block through one or more intervening flip-flop blocks to the various flip-flop blocks.

The separately placeable nature of the control block and the flip-flop blocks allows for the ready replacement of individual circuit elements and the potential re-layout of those circuit elements. For example, to make room for another circuit element moved within or added to the layout, the one or more processors can move one or more of the cells for the control block and the flip-flop blocks, and re-route the connections performed at 850 for the moved cell (or cells).

Similarly, because control blocks and flip-flop blocks are separately placeable, they are separately replaceable or adjustable. Because the shared control components are concentrated in the control block, when a designer updates the FlexMBFF by adding or removing a flip-flop cell or replacing an existing flip-flop block for another with different values (e.g., for VT or drive strength), the one or more processors can adjust the control components in the control block (or replace the existing control block with a different control block) based on the updated characteristics of the FlexMBFF. Accordingly, the designer can increase or decrease the drive strength, VT, and clock skew (among other characteristics) offered by the control block without having to a computationally expensive de-banking/re-banking procedure when creating a customized FlexMBFF.

At block 860, the one or more processors (optionally) define a FlexMBFF family based on the FlexMBFF instance. In various embodiments, 860 is omitted when the designer indicates that a FlexMBFF family is not desired (e.g., only the instance of the converted Flexx MBFF is desired) or when the one or more processors identify that an equivalent FlexMBFF family has been previously defined and is already stored in a library. The FlexMBFF family uses the FlexMBFF instance generated (based on the pre-built FF) as a basis for the layout and selection of the internal elements (e.g., the control components and the flip-flop components), but various additional components are also included in the family with a plurality of different drive strengths, voltage thresholds, and transistors types. Individual blocks in the family can have different internal constructions to allow a designer to swap out different control blocks or bit-slice blocks for new blocks with the desired drive strengths, voltage threshold, or transistor types. The various additional components thus allow the designers flexibility in adjusting the operation of the FlexMBFF and the defined family of FlexMBFFs can be used in the future (e.g., as per method 400 discussed in relation to FIG. 4).

Figure 9:
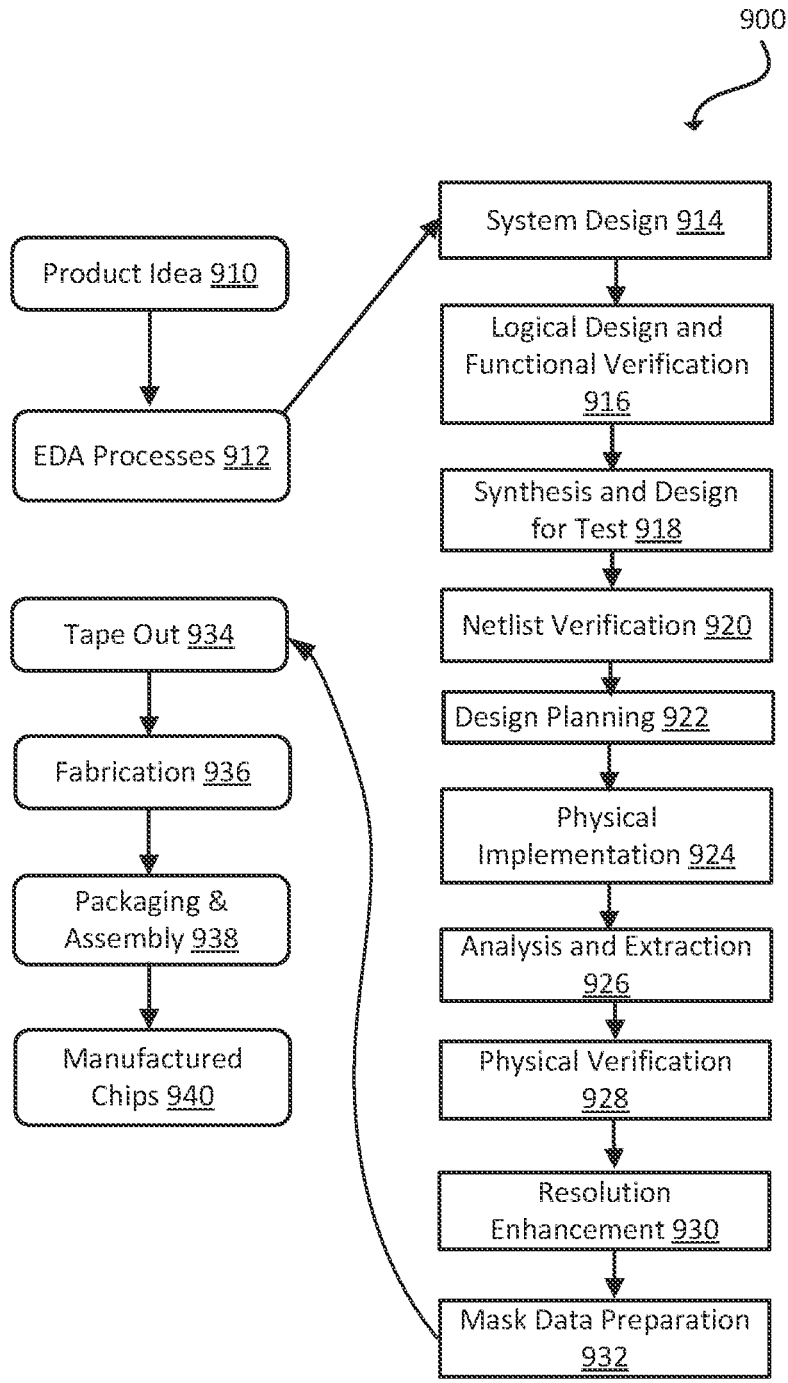
FIG. 9 depicts a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a less representative description adds more useful detail into the design description, for example, more details for the modules that include the description. The lower levels of representation that are less representative descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 9. The processes described by be enabled by EDA products (or tools).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

Figure 10:
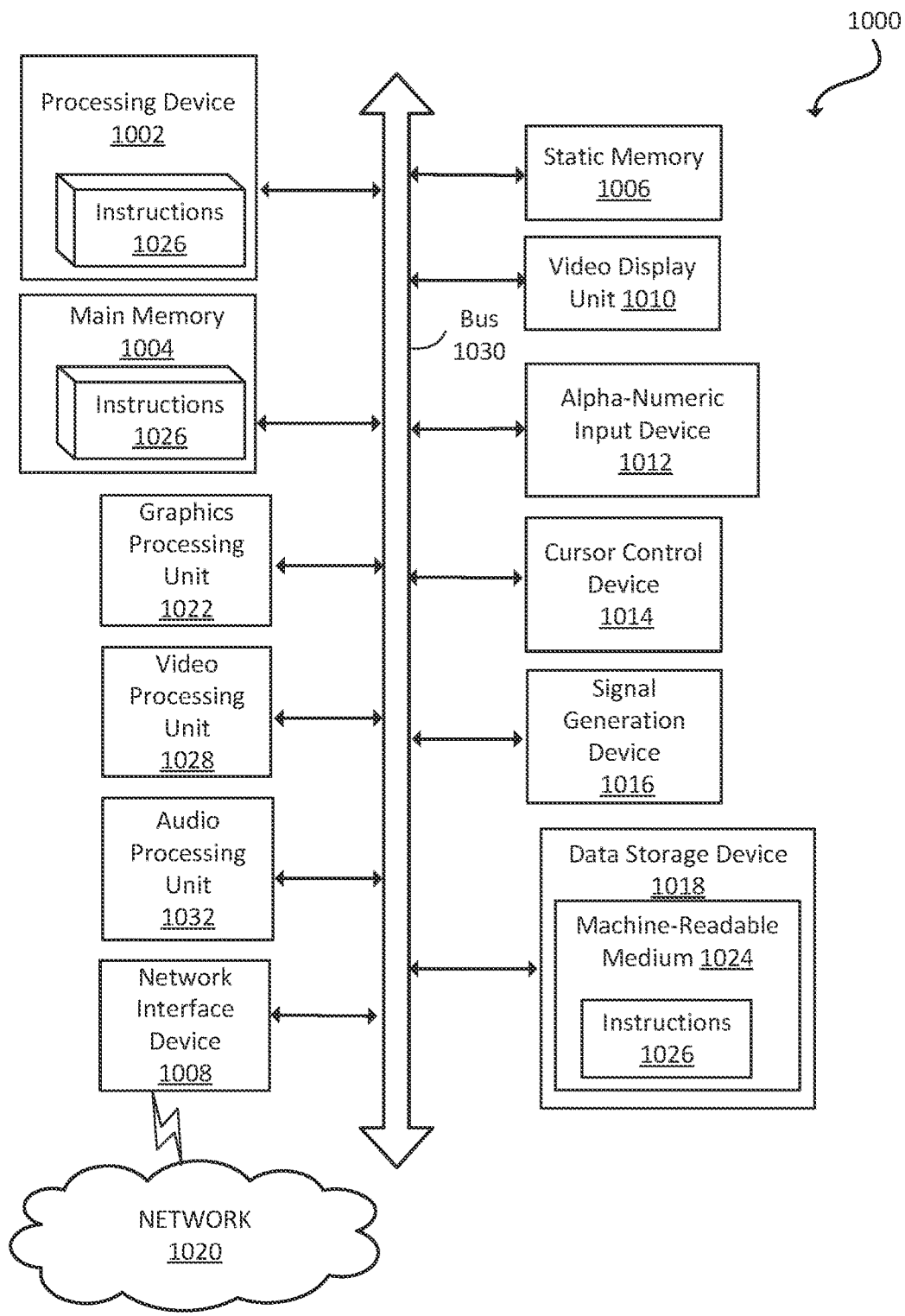
FIG. 10 depicts a representative diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

We claim:

1. A method comprising:
   identifying control components and flip-flop components in a cell;
   defining a first flip-flop block to contain a first portion of the flip-flop components;
   defining a control block to contain the control components;
   generating a flexible multi-bit flip-flop (FlexMBFF) instance based on routing of shared signals pathways from the control block to the first flip-flop block; and
   defining, based on the FlexMBFF instance, a FlexMBFF family that includes a plurality of control blocks and a plurality of flip-flop blocks with different characteristics.

2. The method of claim 1, wherein the cell is a multi-bit flip-flop, and wherein the method further comprises:
   defining a plurality of drive strengths and a plurality of transistor types with different voltage thresholds for each of the plurality of control blocks and each of the plurality of flip-flop blocks.

3. The method of claim 1, wherein the cell is a single-bit flip-flop, and wherein the method further comprises:
   defining a plurality of drive strengths and a plurality of transistor types with different voltage thresholds for the control block and the first flip-flop block.

4. The method of claim 1 further comprising:
   replacing the first flip-flop block with a second flip-flop block from the FlexMBFF family, the second flip-flop block containing different flip-flop components than the first portion of the flip-flop components.

5. The method of claim 4 further comprising adjusting the control components in the control block based on characteristics of the second flip-flop block.

6. The method of claim 1 further comprising defining a second flip-flop block to contain a second portion of the flip-flop components.

7. The method of claim 6, wherein the FlexMBFF instance is further generated based on routing of signal pathways from the control block to the second flip-flop block.

8. The method of claim 1, wherein the control components comprise one or more of a first component to receive a first signal, a second component to route a second signal, and a third component to manipulate a third signal, and the flip-flop components comprise one or more of a fourth component to store a bit in a memory, a fifth component to clear the memory, and a sixth component to read a bit out from the memory.

9. A system comprising:
   a memory storing instructions; and
   a processor coupled with the memory and to execute the instructions, the instructions when executed cause the processor to:
   identify control components and flip-flop components in a cell;
   define a first flip-flop block to contain a first portion of the flip-flop components;
   define a control block to contain the control components;
   generate a flexible multi-bit flip-flop (FlexMBFF) instance based on routing of shared signals pathways from the control block to the first flip-flop block; and
   define, based on the FlexMBFF instance, a FlexMBFF family that includes a plurality of control blocks and a plurality of flip-flop blocks with different characteristics.

10. The system of claim 9, wherein the cell is a multi-bit flip-flop, and wherein the processor is further caused to:
    define a plurality of drive strengths and a plurality of transistor types with different voltage thresholds for the plurality of control blocks and each of the plurality of flip-flop blocks.

11. The system of claim 9, wherein the cell is a single-bit flip-flop, and wherein the processor is further caused to:
    define a plurality of drive strengths and a plurality of transistor types with different voltage thresholds for the control block and the first flip-flop block.

12. The system of claim 9, wherein the processor is further caused to replace the first flip-flop block with a second flip-flop block from the FlexMBFF family, the second flip-flop block containing different flip-flop components than the first portion of the flip-flop components.

13. The system of claim 12, wherein the processor is further caused to adjust the control components in the control block based on characteristics of the second flip-flop block.

14. The system of claim 9, wherein the processor is further caused to define a second flip-flop block to contain a second portion of the flip-flop components.

15. The system of claim 14, wherein the FlexMBFF instance is further generated based on routing of signal pathways from the control block to the second flip-flop block.

16. The system of claim 9, wherein the control components comprise components to receive signals, components to route signals and/or components to manipulate signals, and the flip-flop components comprise components to store a bit in a memory, components to clear the memory, and/or components a bit out from the memory.

17. A non-transitory computer readable medium comprising stored instructions, which when executed by a processor, cause the processor to:
define one or more flip-flop blocks based on a number of bits of a flip-flop, wherein each of the one or more flip-flop blocks is defined to contain a respective portion of flip-flop components of the flip-flop;
define a control block to contain control components of the flip-flop; and
generating a flexible multi-bit flip-flop (FlexMBFF) instance based on routing of shared signals pathways from the control block to the one or more flip-flop blocks.

18. The non-transitory computer readable medium of claim 17, wherein a number of the one or more flip-flop blocks is equal to the number of bits of the flip-flop.

19. The non-transitory computer readable medium of claim 17, wherein a first flip-flop block of the one or more flip-flop blocks contains a first portion of the flip-flop components and a second flip-flop block of the one or more flip-flop blocks contains a second portion of the flip-flop components, and wherein at least one flip-flop component of the first portion differs from at least one flip-flop component of the second portion.

20. The non-transitory computer readable medium of claim 17, wherein the processor is further caused to define, based on the FlexMBFF instance, a FlexMBFF family.

* * * * *